(12) United States Patent
Aiba et al.

(10) Patent No.: US 9,913,160 B2
(45) Date of Patent: *Mar. 6, 2018

(54) COMMUNICATION APPARATUS AND COMMUNICATION METHOD

(71) Applicant: SHARP KABUSHIKI KAISHA, Osaka-shi, Osaka (JP)

(72) Inventors: Tatsushi Aiba, Osaka (JP); Shohei Yamada, Osaka (JP); Hiroshi Katsuragawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 79 days.

This patent is subject to a terminal disclaimer.

(21) Appl. No.: 15/015,838

(22) Filed: Feb. 4, 2016

(65) Prior Publication Data

US 2016/0157121 A1 Jun. 2, 2016

Related U.S. Application Data

(60) Continuation of application No. 13/474,393, filed on May 17, 2012, now Pat. No. 9,288,030, which is a
(Continued)

(30) Foreign Application Priority Data

Sep. 6, 2007 (JP) .................................. 2007-231154

(51) Int. Cl.
*H04W 24/10* (2009.01)
*H04L 1/00* (2006.01)
(Continued)

(52) U.S. Cl.
CPC .......... *H04W 24/10* (2013.01); *H04L 1/0001* (2013.01); *H04L 5/0037* (2013.01);
(Continued)

(58) Field of Classification Search
CPC ............. H04W 24/10; H04W 72/0406; H04W 72/0413; H04W 72/085; H04L 1/0001;
(Continued)

(56) References Cited

U.S. PATENT DOCUMENTS 6,871,066 B1 3/2005 Khullar et al.
6,993,294 B2 1/2006 Nobukiyo et al.
(Continued)

FOREIGN PATENT DOCUMENTS

CN 101002440 A 7/2007
EP 1 526 674 A1 4/2005
(Continued)

OTHER PUBLICATIONS

"3rd Generation Partnership Project; Technical Specification Group Radio Access Network; Evolved Universal Terrestrial Radio Access (E-UTRA); Physical Layer procedures (Release 8)," 3GPP TS 36.213 v8.0.0, XP 05077555, pp. 1-14, Sep. 1, 2007.
(Continued)

*Primary Examiner* — Ajay Cattungal
(74) *Attorney, Agent, or Firm* — Birch, Stewart, Kolasch & Birch, LLP

(57) ABSTRACT

A MS transmits, to a BS, uplink data (UD) on a PUSCH, PUSCH being assigned by using a PDCCH. The MS receives on PDCCH, an indication instructing the MS to transmit reception quality information (RQI) without UD on PUSCH, and transmits on PUSCH, to the BS, RQI without UD based on the indication which is received on PDCCH. The indication is specified based on values to which a plurality of fields of information transmitted on PDCCH are set. One of the plurality of fields is a field used for instructing the MS to transmit RQI and another is a field used for indicating a redundancy version. For instructing the MS to transmit RQI without UD on PUSCH, the field used for
(Continued)

instructing the MS to transmit RQI is set to a first single predetermined value (SPV) and the field used for indicating the redundancy version is set to a second SPV.

4 Claims, 5 Drawing Sheets

Related U.S. Application Data division of application No. 13/368,970, filed on Feb. 8, 2012, now Pat. No. 8,630,654, which is a division of application No. 12/461,986, filed on Aug. 31, 2009, now Pat. No. 8,140,021, which is a division of application No. 12/529,042, filed as application No. PCT/JP2008/065848 on Sep. 3, 2008, now Pat. No. 8,688,137.

(51) Int. Cl.
| | |
|---|---|
| H04L 5/00 | (2006.01) |
| H04L 25/02 | (2006.01) |
| H04W 72/04 | (2009.01) |
| H04W 72/08 | (2009.01) |
| H04B 17/24 | (2015.01) |

(52) U.S. Cl.
CPC .......... *H04L 5/0053* (2013.01); *H04L 5/0064* (2013.01); *H04L 5/0094* (2013.01); *H04W 72/0406* (2013.01); *H04B 17/24* (2015.01); *H04L 5/0007* (2013.01); *H04L 25/022* (2013.01); *H04W 72/0413* (2013.01); *H04W 72/085* (2013.01)

(58) Field of Classification Search
CPC ... H04L 5/0037; H04L 5/0053; H04L 5/0064; H04L 5/0094; H04L 5/0007; H04L 25/022; H04B 17/24
See application file for complete search history.

(56) References Cited

U.S. PATENT DOCUMENTS

| | | | |
|---|---|---|---|
| 7,050,824 B2 | 5/2006 | Masseroni et al. | |
| 7,227,854 B2 | 6/2007 | Kim et al. | |
| 7,328,019 B2 | 2/2008 | Nishikawa et al. | |
| 7,352,709 B2 | 4/2008 | Wakabayashi | |
| 7,406,314 B2 | 7/2008 | Sharma | |
| 7,417,964 B2 | 8/2008 | Cho et al. | |
| 7,586,834 B2 | 9/2009 | Byun et al. | |
| 7,616,596 B2 | 11/2009 | Lee et al. | |
| 7,616,610 B2 | 11/2009 | Kuchibhotla et al. | |
| 7,623,863 B2 | 11/2009 | Chen et al. | |
| 7,680,508 B2 | 3/2010 | Liljestrom et al. | |
| 7,693,170 B2 | 4/2010 | Usuda et al. | |
| 7,725,107 B2 | 5/2010 | Sharma | |
| 7,756,198 B2 | 7/2010 | Chen et al. | |
| 7,778,599 B2 | 8/2010 | Li et al. | |
| 7,809,373 B2 | 10/2010 | Park et al. | |
| 7,813,291 B2 | 10/2010 | Yoon et al. | |
| 7,817,605 B2 | 10/2010 | Liu | |
| 7,826,859 B2 | 11/2010 | Lee et al. | |
| 7,917,149 B2 | 3/2011 | Chen et al. | |
| 7,966,646 B2 | 6/2011 | Chou et al. | |
| 7,986,959 B2 | 7/2011 | Malladi et al. | |
| 8,032,146 B2 | 10/2011 | Zhu et al. | |
| 8,045,519 B2 | 10/2011 | Kuchibhotla et al. | |
| 8,054,767 B2 | 11/2011 | Choi et al. | |
| 8,054,817 B2 | 11/2011 | Zhu et al. | |
| 8,064,917 B2 | 11/2011 | Aiba et al. | |
| 8,064,922 B2 | 11/2011 | Aiba et al. | |
| 8,103,297 B2 | 1/2012 | Aiba et al. | |
| 8,107,418 B2 | 1/2012 | Oh | |
| 8,116,256 B2 | 2/2012 | Zhu et al. | |
| 8,126,392 B2 | 2/2012 | Chen et al. | |
| 8,140,021 B2 | 3/2012 | Aiba et al. | |
| 8,248,924 B2 | 8/2012 | Lee et al. | |
| 8,392,968 B2 | 3/2013 | Chou et al. | |
| 2001/0043576 A1 | 11/2001 | Terry | |
| 2003/0073409 A1 | 4/2003 | Nobukiyo et al. | |
| 2003/0210668 A1 | 11/2003 | Malladi et al. | |
| 2004/0043783 A1 | 3/2004 | Anderson | |
| 2004/0242257 A1 | 12/2004 | Valkealahti et al. | |
| 2005/0009527 A1 | 1/2005 | Sharma | |
| 2005/0233754 A1 | 10/2005 | Beale | |
| 2005/0243793 A1 | 11/2005 | Kim et al. | |
| 2006/0013185 A1 | 1/2006 | Seo et al. | |
| 2006/0014505 A1 | 1/2006 | Hiraki | |
| 2006/0058054 A1 | 3/2006 | Hiramatsu | |
| 2006/0087980 A1 | 4/2006 | Ikeda et al. | |
| 2006/0092870 A1 | 5/2006 | Kondou et al. | |
| 2006/0098568 A1 | 5/2006 | Oh et al. | |
| 2006/0211391 A1 | 9/2006 | Nishikawa et al. | |
| 2007/0076807 A1 | 4/2007 | Jin et al. | |
| 2007/0082619 A1 | 4/2007 | Zhang et al. | |
| 2007/0099647 A1 | 5/2007 | Lee et al. | |
| 2007/0121543 A1 | 5/2007 | Kuchibhotla et al. | |
| 2007/0153727 A1 | 7/2007 | McBeath et al. | |
| 2007/0254595 A1 | 11/2007 | Yoon et al. | |
| 2007/0265017 A1 | 11/2007 | Ishii et al. | |
| 2007/0270154 A1 | 11/2007 | Kim et al. | |
| 2007/0275728 A1 | 11/2007 | Lohr et al. | |
| 2008/0005639 A1 | 1/2008 | Frederiksen | |
| 2008/0031170 A1 | 2/2008 | Kikuchi | |
| 2008/0043668 A1 | 2/2008 | Chen et al. | |
| 2008/0045139 A1 | 2/2008 | Chen et al. | |
| 2008/0045174 A1 | 2/2008 | Chen et al. | |
| 2008/0045215 A1 | 2/2008 | Chen et al. | |
| 2008/0064386 A1 | 3/2008 | Nibe | |
| 2008/0070610 A1 | 3/2008 | Nishio | |
| 2008/0186899 A1 | 8/2008 | Zhu et al. | |
| 2008/0186950 A1 | 8/2008 | Zhu et al. | |
| 2008/0188231 A1 | 8/2008 | Zhu et al. | |
| 2008/0207150 A1 | 8/2008 | Malladi et al. | |
| 2008/0212506 A1 | 9/2008 | Lee et al. | |
| 2008/0233964 A1 | 9/2008 | McCoy et al. | |
| 2008/0268785 A1 | 10/2008 | McCoy et al. | |
| 2008/0280567 A1 | 11/2008 | Sharma | |
| 2008/0287138 A1 | 11/2008 | Yoon et al. | |
| 2008/0311919 A1 | 12/2008 | Whinnett et al. | |
| 2008/0316961 A1 | 12/2008 | Bertrand et al. | |
| 2009/0028261 A1 | 1/2009 | Zhang et al. | |
| 2009/0034505 A1 | 2/2009 | Papasakellariou et al. | |
| 2009/0122736 A1 | 5/2009 | Damnjanovic et al. | |
| 2009/0180414 A1 | 7/2009 | Maeda et al. | |
| 2009/0185577 A1 | 7/2009 | Kishiyama et al. | |
| 2009/0190528 A1 | 7/2009 | Chung et al. | |
| 2009/0196249 A1 | 8/2009 | Kawamura et al. | |
| 2009/0201885 A1 | 8/2009 | Kuroda et al. | |
| 2009/0215464 A1 | 8/2009 | Tanno et al. | |
| 2009/0220017 A1 | 9/2009 | Kawamura et al. | |
| 2009/0238121 A1 | 9/2009 | Kotecha | |
| 2009/0238241 A1 | 9/2009 | Hooli et al. | |
| 2009/0305715 A1 | 12/2009 | Barve et al. | |
| 2009/0316633 A1 | 12/2009 | Kato et al. | |
| 2009/0323542 A1* | 12/2009 | Aiba ................. H04L 1/0001 370/252 |
| 2010/0020716 A1 | 1/2010 | Kuchibhotla et al. | |
| 2010/0098006 A1* | 4/2010 | Golitschek Edler Von Elbwart et al. ........ H04L 1/1854 370/329 |
| 2010/0103833 A1* | 4/2010 | Englund ............. H04L 1/0026 370/252 |
| 2010/0113057 A1 | 5/2010 | Englund et al. | |
| 2010/0173638 A1 | 7/2010 | Aiba et al. | |
| 2010/0179702 A1* | 7/2010 | Guo ................... H04W 52/325 700/286 |
| 2010/0183086 A1* | 7/2010 | Ko ..................... H04B 7/0413 375/260 |
| 2010/0232335 A1* | 9/2010 | Lee ..................... H04W 72/005 370/312 |

(56) References Cited

U.S. PATENT DOCUMENTS

| | | | | |
|---|---|---|---|---|
| 2010/0284326 A1* | 11/2010 | Oh | H04L 1/0026 370/328 |
| 2011/0113244 A1* | 5/2011 | Chou | H04L 63/166 713/168 |
| 2011/0158195 A1* | 6/2011 | Toda | H04L 1/0026 370/329 |
| 2011/0173439 A1 | 7/2011 | Chou et al. | |
| 2011/0255629 A1* | 10/2011 | Ko | H04B 7/0413 375/285 |
| 2012/0164958 A1* | 6/2012 | Hoshino | H04L 1/0026 455/73 |
| 2012/0314731 A1* | 12/2012 | Nguyen | H04W 72/042 375/141 |
| 2013/0178221 A1* | 7/2013 | Jung | H04L 9/0844 455/450 |
| 2013/0179678 A1 | 7/2013 | Chou et al. | |
| 2013/0295979 A1* | 11/2013 | Shin | H04W 52/08 455/509 |

FOREIGN PATENT DOCUMENTS

| | | |
|---|---|---|
| EP | 1 811 690 A1 | 7/2007 |
| EP | 1 871 028 A1 | 12/2007 |
| EP | 1 892 975 A1 | 2/2008 |
| EP | 1 916 859 A1 | 4/2008 |
| JP | 2003-510893 A | 3/2003 |
| JP | 2003-199173 A | 7/2003 |
| JP | 2005-130491 A | 5/2005 |
| JP | 2005-237005 A | 9/2005 |
| JP | 2006-262077 A | 9/2006 |
| JP | 2006-352382 A | 12/2006 |
| JP | 2007-043696 A | 2/2007 |
| JP | 2007-124662 A | 5/2007 |
| JP | 2007-166118 A | 6/2007 |
| RU | 2108670 C1 | 4/1998 |
| RU | 2290764 C2 | 12/2006 |
| WO | WO 2005/072073 A2 | 8/2005 |
| WO | WO 2005/122616 A1 | 12/2005 |
| WO | WO 2006/043712 A1 | 4/2006 |
| WO | WO 2006/109436 A1 | 10/2006 |
| WO | WO 2006/109646 A1 | 10/2006 |
| WO | WO 2007/013457 A1 | 2/2007 |
| WO | WO 2008/115110 A1 | 9/2008 |

OTHER PUBLICATIONS

"CQI reporting and resource allocation for CQI reporting w.r.t. DRX level," IPWireless, 3GPP TSG RAN WG2 #57bis, XP050134358, 3 pages, R2-071419, Mar. 26-30, 2007.
3GPP TS 36.213 V1.2.0 (May 2007); 3rd Generation Partnership Project; Technical Specification Group Radio Access Network; Physical layer procedures (Release 8).
3GPP TSG RAN WG1 Meeting #50, R1-073858, Way forward for CQI reporting, Ericsson et al.
3GPP TSG-RAN WG2 Meeting #57 bis R2-071419, CQI Reporting and Resource Allocation for CQI reporting w.r.t. DRX level, IPWireless.
BenQ Mobile, "Dynamic Control of CQI Reporting", 3GPP TSG RAN WG2 #54, R2-062448, Aug. 28 -Sep. 1, 2006; obtained on Feb. 20, 2009; 5 pages.
Chinese Office Action issued in Chinese Patent Applilcation No. 200910173506.1 dated Nov. 26, 2012.
Ericsson, "E-UTRA Intra-Frequency Measurement Configuration and Control", 3GPP TSG-RAN WG2 Meeting #56, R2-063228, Nov. 6-10, 2006; obtained on Jun. 25, 2008; 4 pages.
Eurasian Search Report dated Jan. 13, 2010 in Eurasian Application No. 200901117.
Eurasian Search Report dated Jan. 13, 2010 in Eurasian Application No. 200970770.
Eurasian Search Report issued in Eurasian Patent Application No. 201100351 dated Jun. 17, 2011.
European Search Report issued in European Patent Application No. EP 09 01 1158 dated Aug. 4, 2011.
European Search Report issued in European Patent Application No. EP 09 01 1159 dated Aug. 4, 2011.
European Search Report issued in European Patent Application No. EP 09 01 1160 dated Aug. 4, 2011.
European Search Report issued in European Patent Application No. EP 09 01 1162 dated Aug. 19, 2011.
European Search Report issued in European Patent Application No. EP 09 01 1163 dated Aug. 19, 2011.
European Search Report issued in European Patent Application No. EP 09 01 1164 dated Aug. 19, 2011 L.
European Search Report issued in European Patent Application No. EP 09 01 1165 dated Aug. 19, 2011.
Huawei, "Bandwidth efficient UL L1/L2 control messages", TSG RAN WG1 Meeting #48bis, St. Julian, Malta, Mar. 26-30, 2007, R1-071419.
LG Electronics Inc., "Issue on Periodic Measurement Reporting", 3GPP TSG RAN WG2 #57bis, T doc R2-071448, Mar. 26-30, 2007; obtained on Jun. 25, 2009; 3 pages.
Nokia, "Data-non-associated control signal transmission with UL data", 3GPP TSG RAN WG1 Meeting #48, St. Louis, USA, Feb. 12-16, 2007, R1-071000.
Nokia, Nokia Siemens Networks, "CQI Trigger Mechanism", 3GPP TSG-RAN WG1 Meeting #50, Athens, Greece, Aug. 20-24, 2007, R1-073680.
Nokia, Nokia Siemens Networks, "PDCCH UL and DL Signaling Entity Payloads", 3GPP TSG RAN WG1 #49 Meeting, Kobe, Japan, May 7-11, 2007, R1-072301.
NTT DoCoMo, Fujitsu KDDI, Mitsubishi Electric, Sharp, Toshiba Corporation, "CDMA-Based Multiplexing Method for Multiple ACK/NACK and CQI in E-UTRA Uplink", 3GPP TSG RAN WG1 Meeting #47bis, Sorrento, Italy, Italy, Jan. 15-19, 2007, (Original R1-062742), R1-070100, 7 pages.
Samsung, "Uplink control signal transmission in presence of data", 3GPP TSG RAN WG1 Meeting #48bis, St. Julians, Malta, Mar. 26-30, 2007, R1-071575.
Samsung, CQI Handling During DRX, 3GPP TSG-RAN2 Meeting #58 Tdoc R2-071901, May 7, 2007, pp. 1-4.
SHRCWC, "A New Format of UL Scheduling Grant Signalling for E-UTRA", 3GPP TSG-RAN WG2#55, R2-06xxxx, Oct. 9-12, 2006; obtained on Feb. 20, 2008; 5 pages.
Supplementary Search Report dated Feb. 2, 2011 in European Application No. 08829634.8.
Supplementary Search Report dated Jan. 12, 2011 in European Application No. 08765266.5.
Tdoc R2-071901, "CQI handling during DRX", 3GPP TSG-RAN2 Meeting #58, May 7-11, 2007, Kobe, Japan.
U.S. Advisory Action issued in U.S. Appl. No. 12/461,987 dated Sep. 17, 2012.
U.S. Advisory Action issued in U.S. Appl. No. 13/474,393 dated Dec. 30, 2013.
U.S. Final Office Action issued in U.S. Appl. No. 12/461,987 dated Jul. 5, 2012.
U.S. Notice of Allowance issued in U.S. Appl. No. 12/461,986 dated Dec. 29, 2011.
U.S. Notice of Allowance issued in U.S. Appl. No. 12/461,986 dated Sep. 16, 2011.
U.S. Notice of Allowance issued in U.S. Appl. No. 12/461,988 dated May 10, 2013.
U.S. Notice of Allowance issued in U.S. Appl. No. 12/529,042 dated Nov. 14, 2013.
U.S. Notice of Allowance issued in U.S. Appl. No. 12/529,152 dated Jul. 26, 2011.
U.S. Notice of Allowance issued in U.S. Appl. No. 12/555,536 dated Apr. 2, 2012.
U.S. Notice of Allowance issued in U.S. Appl. No. 12/555,555 dated Sep. 25, 2012.
U.S. Notice of Allowance issued in U.S. Appl. No. 12/555,566 dated Jul. 18, 2011.
U.S. Notice of Allowance issued in U.S. Appl. No. 12/555,578 dated Aug. 31, 2011.

(56) References Cited

OTHER PUBLICATIONS

U.S. Notice of Allowance issued in U.S. Appl. No. 12/555,593 dated Sep. 2, 2011.
U.S. Notice of Allowance issued in U.S. Appl. No. 13/315,108 dated Sep. 11, 2012.
U.S. Notice of Allowance issued in U.S. Appl. No. 13/368,970 dated Aug. 21, 2013.
U.S. Notice of Allowance issued in U.S. Appl. No. 13/620,084 dated Apr. 6, 2015.
U.S. Notice of Allowance issued in U.S. Appl. No. 13/620,084 dated Jul. 1, 2013.
U.S. Notice of Allowance issued in U.S. Appl. No. 13/672,656 dated Oct. 28, 2013.
U.S. Notice of Allowance issued in U.S. Appl. No. 13/906,107 dated Dec. 18, 2013.
U.S. Notice of Allowance issued in U.S. Appl. No. 13/926,803 dated Sep. 25, 2013.
U.S. Office Action issued in U.S. Appl. No. 12/315,108 dated May 3, 2012.
U.S. Office Action issued in U.S. Appl. No. 12/461,987 dated May 22, 2015.
U.S. Office Action issued in U.S. Appl. No. 12/461,987 dated Oct. 23, 2014.
U.S. Office Action issued in U.S. Appl. No. 12/461,988 dated May 10, 2012.
U.S. Office Action issued in U.S. Appl. No. 12/529,042 dated Mar. 15, 2013.
U.S. Office Action issued in U.S. Appl. No. 12/529,042 dated May 14, 2012.
U.S. Office Action issued in U.S. Appl. No. 12/529,042 dated Sep. 6, 2012.
U.S. Office Action issued in U.S. Appl. No. 12/555,555 dated Jun. 28, 2012.
U.S. Office Action issued in U.S. Appl. No. 13/368,970 dated Feb. 15, 2013.
U.S. Office Action issued in U.S. Appl. No. 13/474,393 dated Jan. 15, 2013.
U.S. Office Action issued in U.S. Appl. No. 13/474,393 dated Jun. 19, 2015.
U.S. Office Action issued in U.S. Appl. No. 13/474,393 dated Sep. 27, 2013.
U.S. Office Action issued in U.S. Appl. No. 13/620,084 dated Jan. 15, 2013.
U.S. Office Action issued in U.S. Appl. No. 13/620,084 dated Oct. 6, 2014.
U.S. Office Action issued in U.S. Appl. No. 13/672,656 dated Aug. 12, 2013.
U.S. Office Action issued in U.S. Appl. No. 13/672,656 dated Sep. 19, 2013.
U.S. Office Action issued in U.S. Appl. No. 13/906,107 dated Nov. 5, 2013.
U.S. Office Action issued in U.S. Appl. No. 13/926,803 dated Aug. 15, 2013.
U.S. Office Action issued in U.S. Appl. No. 14/527,468 dated Mar. 4, 2015.
U.S. Office Action, dated Apr. 15, 2011, in U.S. Appl. No. 12/555,578.
U.S. Office Action, dated Apr. 15, 2011, in U.S. Appl. No. 12/555,593.
U.S. Office Action, dated Apr. 5, 2011, in U.S. Appl. No. 12/461,988.
U.S. Office Action, dated Aug. 17, 2011, in U.S. Appl. No. 12/461,988.
U.S. Office Action, dated Dec. 10, 2010, in U.S. Appl. No. 12/461,986.
U.S. Office Action, dated Dec. 13, 2010 in U.S. Appl. No. 12/461,988.
U.S. Office Action, dated Dec. 13, 2010, in U.S. Appl. No. 12/529,042.
U.S. Office Action, dated Dec. 9, 2010, in U.S. Appl. No. 12/461,987.
U.S. Office Action, dated Jan. 19, 2011, in U.S. Appl. No. 12/555,566.
U.S. Office Action, dated Jan. 21, 2011, in U.S. Appl. No. 12/529,152.
U.S. Office Action, dated Jan. 26, 2011, in U.S. Appl. No. 12/461,986.
U.S. Office Action, dated Jan. 27, 2011, in U.S. Patent Application No. 12/461,987.
U.S. Office Action, dated Jul. 8, 2011, in U.S. Appl. No. 12/529,042.
U.S. Office Action, dated Jun. 13, 2011, in U.S. Appl. No. 12/461,988 (Advisory Action).
U.S. Office Action, dated Jun. 24, 2011, in U.S. Appl. No. 12/461,987.
U.S. Office Action, dated Oct. 14, 2010, in U.S. Appl. No. 12/529,152.
U.S. Office Action, dated Sep. 23, 2011, in U.S. Appl. No. 12/529,042.
U.S. Notice of Allowance issued in U.S. Appl. No. 13/474,393 dated Nov. 6, 2015.
U.S. Office Action issued in U.S. Appl. No. 13/474,393 dated Nov. 7, 2014.

* cited by examiner

COMMUNICATION APPARATUS AND COMMUNICATION METHOD

CROSS-REFERENCE TO RELATED APPLICATIONS

This Application is a Continuation of co-pending application Ser. No. 13/474,393, filed on May 17, 2012, which is a Divisional of application Ser. No. 13/368,970, filed on Feb. 8, 2012, now U.S. Pat. No. 8,630,654, which is a Divisional of application Ser. No. 12/461,986, filed on Aug. 31, 2009, now U.S. Pat. No. 8,140,021, which is a Divisional Application of application Ser. No. 12/529,042, filed Aug. 28, 2009, now U.S. Pat. No. 8,688,137, which was filed as 371 National Phase Application No. PCT/JP2008/065848 filed Sep. 3, 2008 under 35 U.S.C § 120. This Application also claims priority under 35 U.S.C § 119 to Japanese Application No. JP 2007-231154 filed Sep. 6, 2007. The entire contents of each of these applications are hereby incorporated by reference in their entireties.

BACKGROUND OF THE INVENTION

Technical Field

The present invention relates to a communication technique, and particularly, to a mobile communication system in which a mobile station apparatus measures reception quality of a signal received from a base station apparatus to transmit reception quality information to the base station apparatuses, and relates to a base station apparatus and a mobile station apparatus which are adapted to the mobile communication system.

Background Art

Recently, demand for data communication is increasing in a mobile communication system, and various techniques are proposed to obtain high frequency use efficiency meeting the increase in the communication data associated with the demand. One of the techniques for increasing the frequency use efficiency is OFDMA (Orthogonal Frequency Division Multiple Access). The OFDMA relates to a technique of modulation method of communication in which the same frequency is used in all cells in a communication area constituted by the cells, and the OFDMA can achieve fast data communication. In the scheduling of transmission packets in the OFDMA system, a method is known in which mobile station apparatuses transmit CQI (Channel Quality Indicator), which is information indicating the reception quality of a downlink state for sub-carriers in wideband, to a base station apparatus, and the base station apparatus performs scheduling of the packets based on the CQI of sub-carriers in wideband transmitted from the mobile station apparatuses.

Furthermore, in the scheduling of transmission packets in an OFDM (Orthogonal Frequency Division Multiplexing) system using a plurality of sub-carriers, a technique is also known in which mobile station apparatuses evaluate each channel states of a downlink (frequency characteristics, or characteristics such as transmission loss dependent on the frequency) and transmit information with quantized each channel states to a base station apparatus, and the base station apparatus determines sub-carriers to be assigned to the mobile station apparatuses based on the transmitted information (see, Patent Document 1 below). FIG. 5 is a diagram showing an overview of a conventional communication method between a base station apparatus and a mobile station apparatus. FIG. 5(A) is a diagram showing a system configuration example, and FIG. 5(B) is a diagram showing a characteristic example. Having received downlink information 205 of a downlink line used for reception quality measurement from a base station apparatus 201, a mobile station apparatus measures the reception quality of each channel (FIG. 5(B)) based on the downlink information and quantizes the measured reception quality of each channel to create a channel profile of a propagation path.

The channel profile created by the mobile station apparatus 203 is transmitted, from the mobile station apparatus 203 to the base station apparatus 201, as reception quality information 207 using an uplink line. The base station apparatus 201 executes processing, such as adaptive modulation and coding or frequency selective scheduling, upon signals transmitted from the base station apparatus 201 to the mobile station apparatus 203 based on the reception quality information 207.

In relation to the transmission of reception quality information by the mobile station apparatus to the base station apparatus, transmission from the mobile station apparatus to the base station apparatus by using a dedicated uplink control channel (hereinafter, referred to as PUCCH (Physical Uplink Control Channel)) and an uplink shared data channel (hereinafter, PUSCH (Physical Uplink Shared Channel)) is examined in the evolution of third generation wireless access (Evolved Universal Terrestrial Radio Access) examined in 3GPP (3rd Generation Partnership Project) that is an international standardization project. For example, Non-Patent Document 1 described below proposes transmitting the reception quality information using the PUCCH or the PUSCH depending on the type of services, in which required reception quality information varies, when the mobile station apparatus transmits the reception quality information to the base station apparatus.

Patent Document 1: JP Patent Publication (Kokai) No. 2005-130491A

Non-Patent Document 1: "CQI handling during DRX", 3GPP, TSG RAN WG2 Meeting #58, R2-071901, May 2007

DISCLOSURE OF THE INVENTION

Problems to be Solved by the Invention

However, in the above conventional technique, uplink data and reception quality information needed to be transmitted at the same time when the mobile station apparatus transmits the reception quality information using the PUSCH. Thus, there was a problem that the mobile station apparatus could not transmit the reception quality information using the PUSCH if there was no uplink data to be transmitted to the base station apparatus. In general, since the resource region assigned as the PUCCH is smaller than the resource region assigned as the PUSCH, the amount of information of the reception quality information that can be transmitted using the PUCCH is small. On the other hand, the reception quality information transmitted using the PUSCH is reception quality information including a large amount of information.

The base station apparatus performs processing, such as adaptive modulation and coding or frequency selective scheduling, upon the signals to be transmitted to the mobile station apparatus based on the reception quality information transmitted from the mobile station apparatus. When the mobile station apparatus transmits reception quality information including a small amount of information using the PUCCH, the base station apparatus does not execute processing, such as highly accurate adaptive modulation and coding or frequency selective scheduling, in accordance with the amount of information, or executes only the processing of adaptive modulation and coding to transmit signals to the mobile station apparatus. When the mobile station apparatus transmits reception quality information including a large amount of information using the PUSCH, the base station apparatus executes processing, such as highly accurate adaptive modulation and coding or frequency selective scheduling, based on the information to transmit signals to the mobile station apparatus.

In this way, when the reception quality information transmitted from the mobile station apparatus includes a large amount of information, the base station apparatus can perform processing, such as highly accurate adaptive modulation and coding or frequency selective scheduling, upon the signals to be transmitted. As a result, the communication control (scheduling) between the base station apparatus and the mobile station apparatus can be more efficiently performed.

There are various types of services performed between the mobile station apparatus and the base station apparatus, such as VoIP (voice call), WEB browsing, and TV phone. One of the services is a service of continuing to download a large amount of data (UDP packets) such as moving images, and in that case, there is no uplink data to be transmitted from the mobile station apparatus to the base station apparatus.

Thus, in the conventional technique, the mobile station apparatus cannot transmit the reception quality information including a large amount of information using the PUSCH in a service in which a great amount of data (UDP packets), such as moving images, is continuously downloaded without the uplink data. This means that the base station apparatus cannot perform processing, such as highly accurate adaptive modulation and coding or frequency selective scheduling, upon the signals to be transmitted in the case of services without the uplink data, and that the communication control (scheduling) between the base station apparatus and the mobile station apparatus cannot be more efficiently performed.

Furthermore, in the conventional technique, there was no specific description of what kind of control information the base station apparatus uses to control the mobile station apparatus when the mobile station apparatus transmits only the reception quality information using the PUSCH, and what kind of exchange is made between the base station apparatus and the mobile station apparatus to transmit the reception quality information. In the transmission of the reception quality information by the mobile station apparatus to the base station apparatus, there is a demand that the base station apparatus controls the amount of information and the frequency of transmissions of the reception quality information transmitted from the mobile station apparatus. The base station apparatus should control the amount of information and the frequency of transmissions of the transmitted reception quality information in consideration of the uplink resource in the cell controlled by the base station apparatus. If large-sized reception quality information is frequently transmitted based on the decision of each mobile station apparatus, the uplink source in the cell becomes scarce, and if small-sized reception quality information is transmitted infrequently, the uplink resource is wasted. Thus, when the mobile station apparatus transmits the reception quality information to the base station apparatus, what kind of control information the base station apparatus uses to control the mobile station apparatus and what kind of exchange is made between the base station apparatus and the mobile station apparatus to transmit the reception quality information are important issues. An efficient transmission control method is needed in which the amount of information and the frequency of transmissions of the reception quality information to be transmitted are taken into account.

The present invention has been made in view of the foregoing circumstances, and an object of the present invention is to provide a mobile communication system, a base station apparatus, and a mobile station apparatus which can transmit reception quality information including a large amount of information from a mobile station apparatus even if there is no uplink data between the mobile station apparatus and the base station apparatus, and perform transmission control flexibly responding to the amount of information and the frequency of transmissions of the reception quality information transmitted from the mobile station apparatus to achieve more efficient communication control (scheduling) between the base station apparatus and the mobile station apparatus.

Means for Solving the Problems (1) The present invention provides a mobile communication system in which a mobile station apparatus transmits reception quality information to a base station apparatus, the reception quality information indicating quality of a signal received from the base station apparatus, characterized in that the base station apparatus transmits information for instructing transmission of reception quality information without uplink data included in an uplink data transmission permission signal, and the mobile station apparatus transmits reception quality information without uplink data according to the information for instructing transmission of reception quality information without uplink data.

(2) The mobile communication system is characterized in that the mobile station apparatus transmits, to the base station apparatus, the reception quality information using an uplink shared data channel.

(3) The present invention provides a mobile communication system in which a mobile station apparatus transmits reception quality information to a base station apparatus using an uplink shared channel, the reception quality information indicating quality of a signal received from the base station apparatus, characterized in that the base station apparatus transmits information for instructing transmission of reception quality information without uplink data included in an uplink data transmission permission signal, and the mobile station apparatus transmits reception quality information without uplink data according to the information for instructing transmission of reception quality information without uplink data.

(4) The present invention provides a mobile communication system in which a mobile station apparatus transmits reception quality information to a base station apparatus, the reception quality information indicating quality of a signal received from the base station apparatus, characterized in that the base station apparatus transmits information for instructing transmission of reception quality information without uplink data included in an uplink data transmission permission signal, the mobile station apparatus transmits reception quality information without uplink data according to the information for instructing transmission of reception quality information without uplink data; and at this time; and at this time, in case that ACK or NACK for downlink data needs to be transmitted, transmits reception quality information and ACK or NACK without uplink data.

(5) The mobile communication system is characterized in that the mobile station apparatus transmit, to the base station apparatus, the reception quality information and the ACK or the NACK using an uplink shared data channel.

(6) The present invention provides a mobile communication system in which a mobile station apparatus transmits reception quality information to a base station apparatus using an uplink shared channel, the reception quality information indicating quality of a signal received from the base station apparatus, characterized in that the base station apparatus transmits information for instructing transmission of reception quality information without uplink data included in an uplink data transmission permission signal, the mobile station apparatus transmits reception quality information without uplink data according to the information for instructing transmission of reception quality information without uplink data; and at this time, in case that ACK or NACK for downlink data needs to be transmitted, transmits, to the base station apparatus, reception quality information and ACK or NACK without uplink data.

(7) The mobile communication system is characterized in that the information for indicating transmission of reception quality information without uplink data is represented by using information for instructing transmission of reception quality information and information constituting an uplink data transmission permission signal.

(8) The mobile communication system is characterized in that the information constituting the uplink data transmission permission signal is HARQ redundancy version information.

(9) The mobile communication system is characterized in that the information constituting the uplink data transmission permission signal is MCS information.

(10) The mobile communication system is characterized in that the information constituting the uplink data transmission permission signal is transport block size information.

(11) The present invention provides a base station apparatus in a mobile communication system in which a mobile station apparatus transmits reception quality information to the base station apparatus, the reception quality information indicating quality of a signal received from the base station apparatus, the base station apparatus characterized by comprising: means for transmitting information for instructing transmission of reception quality information without uplink data included in an uplink data transmission permission signal to the mobile station apparatus.

(12) The present invention provides a base station apparatus in a mobile communication system in which a mobile station apparatus transmits reception quality information to the base station apparatus using an uplink shared channel, the reception quality information indicating quality of a signal received from the base station apparatus, the base station apparatus characterized by comprising: means for transmitting information for instructing transmission of reception quality information without uplink data included in an uplink data transmission permission signal to the mobile station apparatus.

(13) The base station apparatus is characterized in that the information for instructing transmission of reception quality information without uplink data is represented by using information for information for instructing transmission of reception quality information without uplink data transmission of reception quality information and information constituting an uplink data transmission permission signal.

(14) The base station apparatus is characterized in that the information constituting the uplink data transmission permission signal is HARQ redundancy version information.

(15) The base station apparatus is characterized in that the information constituting the uplink data transmission permission signal is MCS information.

(16) The base station apparatus is characterized in that the information constituting the uplink data transmission permission signal is transport block size information.

(17) The present invention provides a mobile station apparatus in a mobile communication system a mobile station apparatus in a mobile communication system in which the mobile station apparatus transmits reception quality information to a base station apparatus, the reception quality information indicating quality of a signal received from the base station apparatus, the mobile station apparatus characterized by comprising: means for receiving an uplink data transmission permission signal including information for instructing transmission of reception quality information without uplink data from the base station apparatus; and means for transmitting reception quality information without uplink data to the base station apparatus according to the information for instructing transmission of reception quality information without uplink data.

(18) The mobile station apparatus is characterized in that the means for transmitting reception quality information to the base station apparatus transmits the reception quality information using an uplink shared data channel.

(19) The present invention provides a mobile station apparatus in a mobile communication system in which the mobile station apparatus transmits reception quality information to a base station apparatus using an uplink shared channel, the reception quality information indicating quality of a signal received from the base station apparatus, the mobile station apparatus characterized by comprising: means for receiving an uplink data transmission permission signal including information for instructing transmission of reception quality information without uplink data from the base station apparatus; and means for transmitting reception quality information without uplink data according to the information for instructing transmission of reception quality information without uplink data to the base station apparatus.

(20) The present invention provides a mobile station apparatus in a mobile communication system in which the mobile station apparatus transmits reception quality information to a base station apparatus, the reception quality information indicating quality of a signal received from the base station apparatus, the mobile station apparatus characterized by comprising: means for receiving an uplink data transmission permission signal including information for instructing transmission of reception quality information without uplink data from the base station apparatus; and means for transmitting reception quality information without uplink data according to the information for instructing transmission of reception quality information without uplink data to the base station apparatus, wherein in case that ACK or NACK for downlink data needs to be transmitted when transmitting reception quality information without uplink data according to the information for instructing transmission of reception quality information without uplink data, the means for transmitting the reception quality information to the base station apparatus transmits the reception quality information and the ACK or the NACK without uplink data.

(21) The mobile station apparatus is characterized in that the means for transmitting the reception quality information to the base station apparatus transmits, to the base station apparatus, the reception quality information and the ACK or the NACK using an uplink shared data channel.

(22) The present invention provides a mobile station apparatus in a mobile communication system in which the mobile station apparatus transmits reception quality information to a base station apparatus using an uplink shared channel, the reception quality information indicating quality of a signal received from the base station apparatus, the mobile station apparatus characterized by comprising: means for receiving an uplink data transmission permission signal including information for instructing transmission of reception quality information without uplink data from the base station apparatus; and means for transmitting reception quality information without uplink data according to the information for instructing transmission of reception quality information without uplink data to the base station apparatus, wherein in case that ACK or NACK for downlink data needs to be transmitted when transmitting reception quality information without uplink data according to the information for instructing transmission of reception quality information without uplink data, the means for transmitting the reception quality information to the base station apparatus transmits reception quality information and ACK or the NACK without uplink data.

(23) The mobile station apparatus is characterized in that the information for instructing transmission of reception quality information without uplink data is represented by using information for instructing transmission of reception quality information and information constituting an uplink data transmission permission signal.

(24) The mobile station apparatus is characterized in that the information constituting the uplink data transmission permission signal is HARQ redundancy version information.

(25) The mobile station apparatus is characterized in that the information constituting the uplink data transmission permission signal is MCS information.

(26) The mobile station apparatus is characterized in that the information constituting the uplink data transmission permission signal is transport block size information.

Advantages of the Invention

According to the present invention, a mobile station apparatus can transmit reception quality information including a large amount of information even if there is no uplink data between the mobile station apparatus and a base station apparatus, and the transmission control flexibly responding to the amount of information and the frequency of transmissions of the reception quality information transmitted from the mobile station apparatus is possible. Therefore, more efficient communication control (scheduling) between the base station apparatus and the mobile station apparatus can be achieved.

DESCRIPTION OF SYMBOLS

A . . . base station apparatus, B . . . mobile station apparatus, 27 . . . transmission information control unit, 27a . . . scheduler unit, 27b . . . modulation encoding control unit, 27c . . . frequency scheduler unit, 63 . . . reception quality information control unit, 63a . . . reception quality information generating unit, 63b . . . reception quality measuring unit.

BEST MODE FOR CARRYING OUT THE INVENTION

First Embodiment

Figure 1:
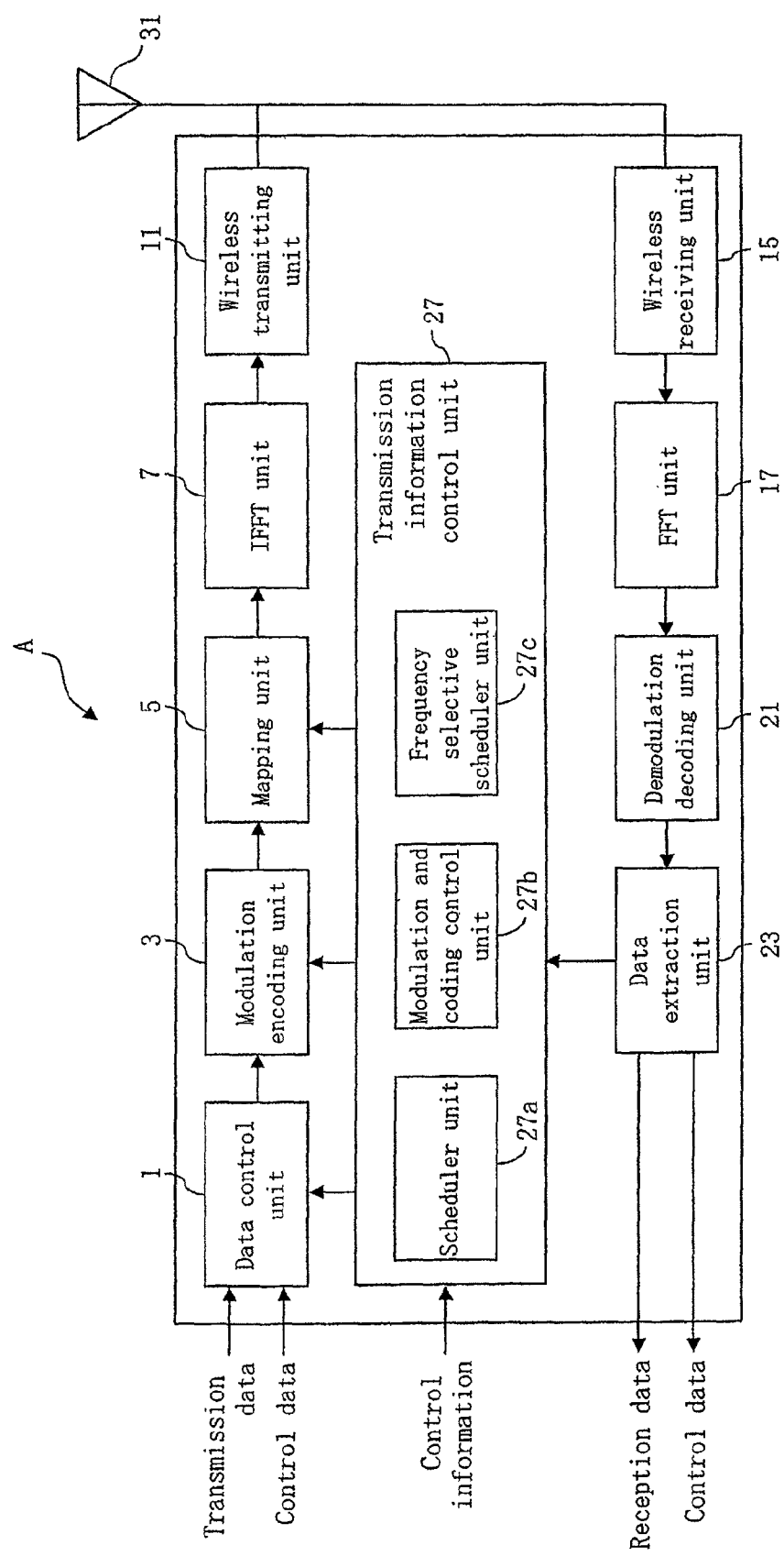
FIG. 1 is a schematic block diagram showing a configuration of a base station apparatus according to a first embodiment of the present invention.
Figure 5:
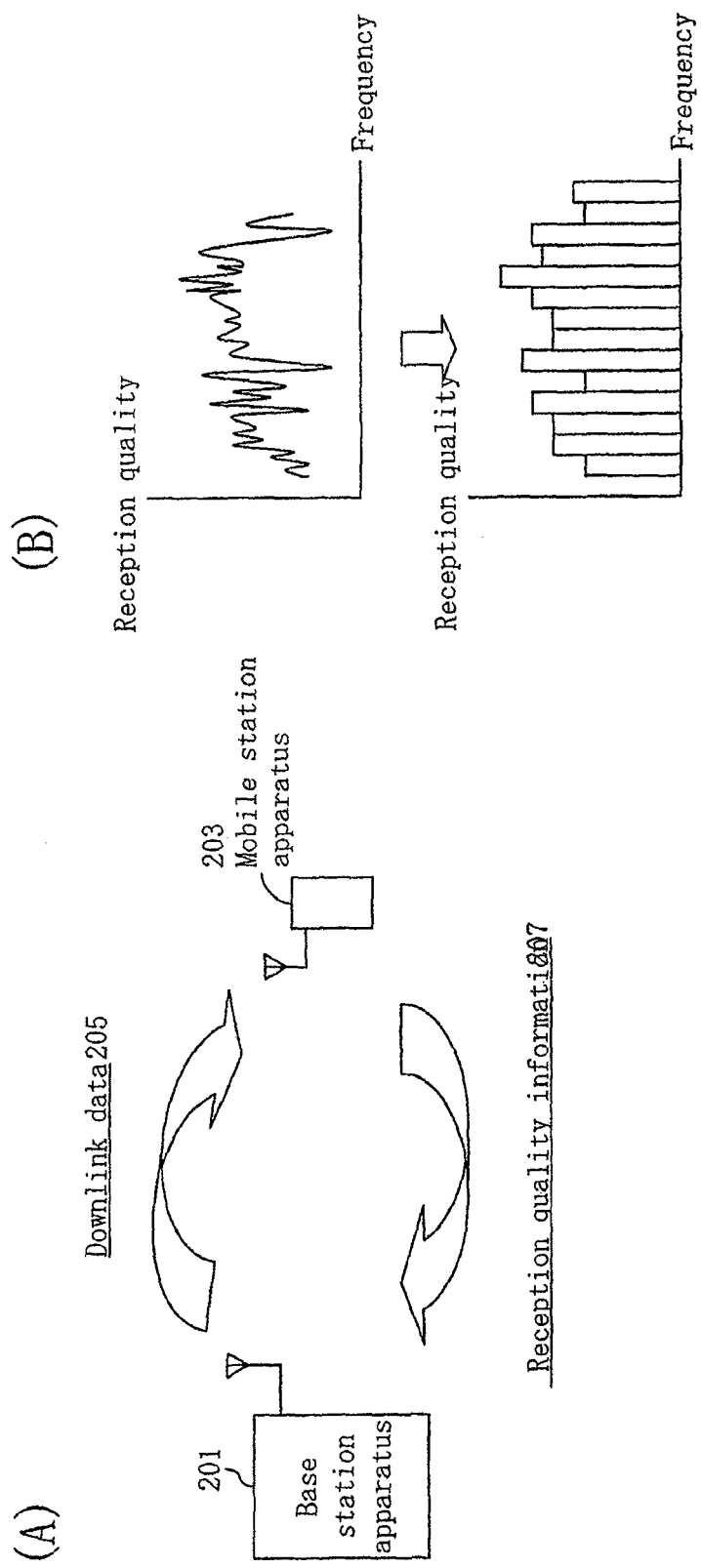
FIG. 5 is a diagram for explaining a general communication method of a base station apparatus and a mobile station apparatus.

First, a mobile communication system according to a first embodiment of the present invention will be described. The mobile communication system according to the present embodiment includes a base station apparatus and a mobile station apparatus and has a configuration similar to that in FIG. 5(A). FIG. 1 is a functional block diagram showing a schematic configuration example of the base station apparatus according to the present embodiment. As shown in FIG. 1, a base station apparatus A comprises a data control unit 1, a modulation encoding unit 3, a mapping unit 5, an inverse fast Fourier transform (IFFT) unit 7, a wireless transmitting unit 11, a wireless receiving unit 15, a fast Fourier transform (FFT) unit 17, a demodulation decoding unit 21, a data extraction unit 23, a transmission information control unit 27, and an antenna 31. The transmission information control unit 27 includes a scheduler unit 27a, a modulation and coding control unit 27b, and a frequency selective scheduler unit 27c.

In the base station apparatus A, transmission data and control data to be transmitted to each mobile station apparatus are inputted to the data control unit 1, and the data is sequentially transmitted to the mobile station apparatuses according to an instruction from the transmission information control unit 27. The modulation encoding unit 3 performs a modulation processing or an error correction coding processing upon a signal outputted from the data control unit based on modulation scheme and coding rate determined by the transmission information control unit 27 and outputs the data to the mapping unit. The mapping unit maps the data outputted from the modulation encoding unit 3 on each sub-carrier based on frequency selective scheduling information outputted from the transmission information control unit 27 and outputs the data to the inverse fast Fourier transform unit 7.

The inverse fast Fourier transform unit 7 performs a processing of inverse fast Fourier transform upon the data outputted from the mapping unit 5, converts the data to a time-series baseband digital signal, and outputs the signal to the wireless transmitting unit 11. The wireless transmitting unit 11 performs digital/analog conversion of the output signal from the inverse fast Fourier transform unit 7, up-converts the signal to a frequency suitable for transmission, and then transmits the signal to each mobile station apparatus through the antenna.

The scheduler unit 27a schedules the downlink and the uplink based on control information, such as a resource region that each mobile station apparatus can use, an intermittent transmission reception cycle, a format of transmission data channel, and a buffer status. The modulating and coding control unit 27b determines the modulation scheme and the coding rate to be applied to each data based on the reception quality information transmitted from the mobile station apparatus. The frequency selective scheduler unit 27c executes a processing of frequency selective scheduling to be applied to each data based on the reception quality information transmitted from the mobile station apparatus. The data extraction unit 23 separates demodulated and decoded data into reception data for user and control data, transfers the data to a superior processing unit, and outputs the reception quality information to the transmission information control unit 27.

Figure 2:
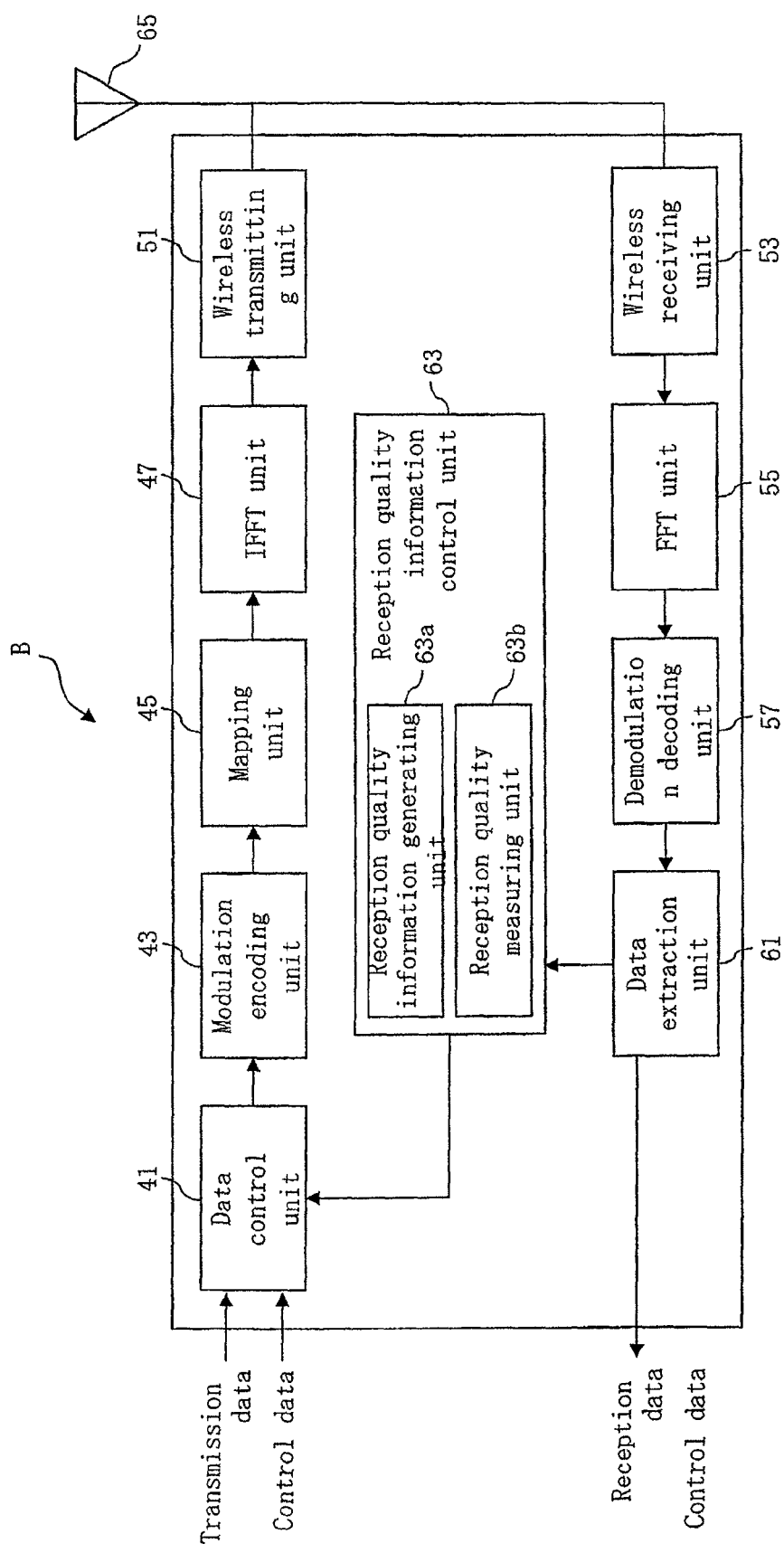
FIG. 2 is a schematic block diagram showing a configuration of a mobile station apparatus according to the first embodiment of the present invention.

FIG. 2 is a functional block diagram showing a schematic configuration example of a mobile station apparatus according to the first embodiment of the present invention. As shown in FIG. 2, a mobile station apparatus B comprises a data control unit 41, a modulation encoding unit 43, a mapping unit 45, an inverse fast Fourier transform (IFFT) unit 47, a wireless transmitting unit 51, a wireless receiving unit 53, a fast Fourier transform (FFT) unit 55, a demodulation decoding unit 57, a data extraction unit 61, a reception quality information control unit 63, and an antenna 65. The reception quality information control unit 63 comprises a reception quality information generating unit 63a and a reception quality measuring unit 63b.

The wireless receiving unit 53, the FFT unit 55, the demodulation decoding unit 57, the data extraction unit 61, and the reception quality information control unit 63 constitute a receiving unit as a whole, and the data control unit 41, the modulation encoding unit 43, the mapping unit 45, the inverse fast Fourier transform (IFFT) unit 47, and the wireless transmitting unit 51 constitute a transmitting unit as a whole.

In the mobile station apparatus B shown in FIG. 2, transmission data and control data to be transmitted to the base station apparatus A are inputted to the data control unit 41, and the data is sequentially transmitted to the base station apparatus. The modulation encoding unit 43 performs a modulation processing or an error correction coding processing upon a signal outputted from the data control unit 41 and outputs the data to the mapping unit 45. The mapping unit 45 maps the data outputted from the modulation encoding unit 43 on each sub-carrier and outputs the data to the inverse fast Fourier transform unit 47.

The inverse fast Fourier transform unit 47 performs a processing of inverse fast Fourier transform upon a symbol sequence outputted from the mapping unit 45, converts the symbol sequence to a time-series baseband digital signal, and outputs the signal to the wireless transmitting unit 51. The wireless transmitting unit performs digital/analog conversion to the output signal from the inverse fast Fourier transform unit 47, up-converts the signal to a frequency suitable for transmission, and then transmits the signal to the base station apparatus A through the antenna.

The reception quality measuring unit 63b measures the reception quality of a signal received from the base station apparatus A. The reception quality information generating unit 63a generates reception quality information to be transmitted to the base station apparatus A based on the information measured by the reception quality measuring unit 63b.

Figure 3:
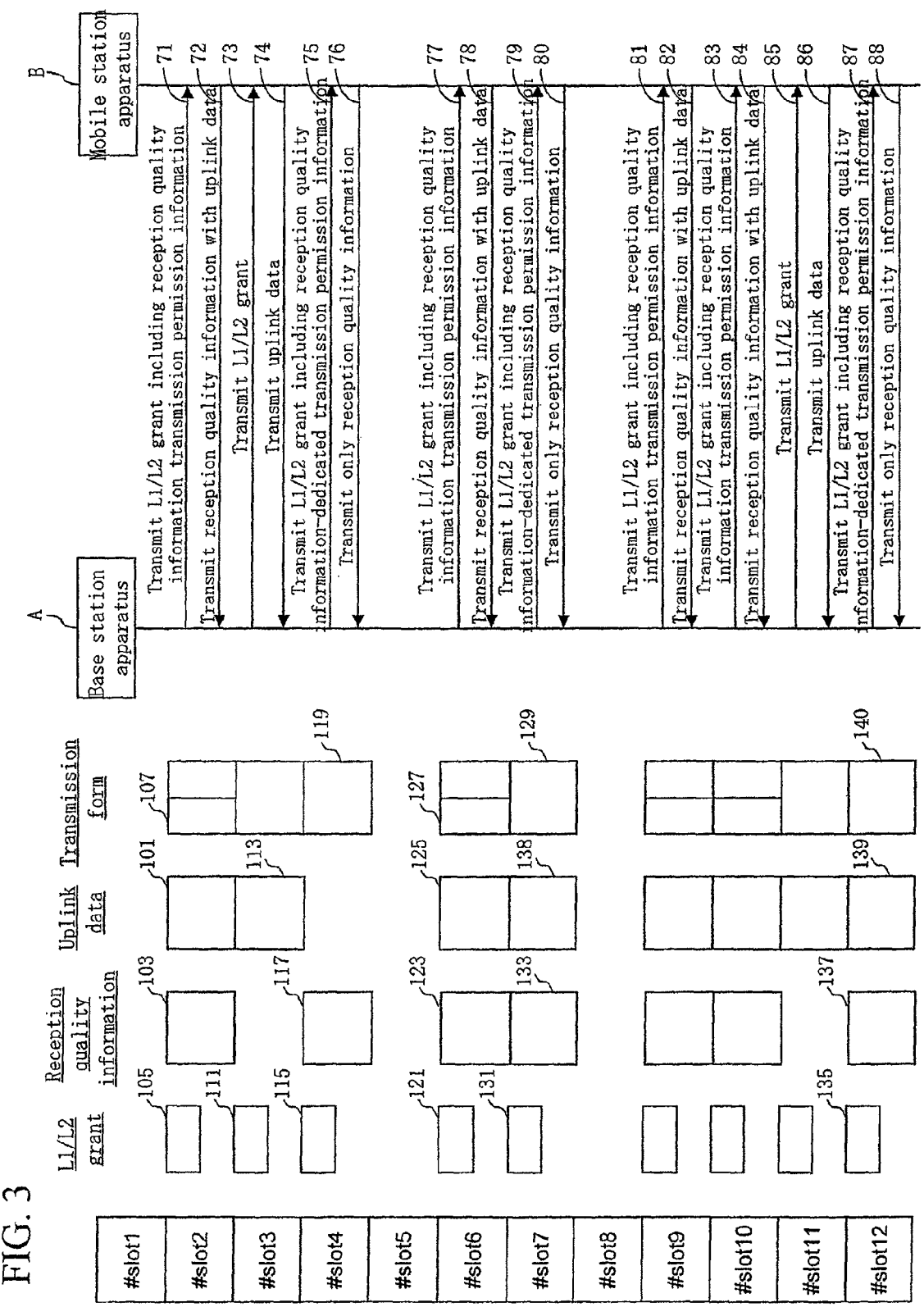
FIG. 3 is a diagram for explaining a processing flow of a modified example of the first embodiment of the present invention.

FIG. 3 is a diagram for explaining a communication technique according to the first embodiment of the present invention. A diagram on the left side of FIG. 3 illustrates control signals (L1/L2 grants) transmitted from the base station apparatus to the mobile station apparatus, reception quality information, uplink data, and transmission forms of information transmitted in uplink, and a diagram on the right side illustrates a processing flow corresponding to the slots. In FIG. 3, operations from #slot1 to #slot12 are illustrated as an example.

The mobile station apparatus B transmits data using PUSCH according to resource assignment indicated by a downlink control channel (hereinafter, PDCCH (Physical Downlink Control Channel)) from the base station apparatus A. Thus, the downlink control channel (PDCCH) is a signal for permitting data transmission in the uplink (uplink data transmission permission signal, "L1/L2 grant" hereinafter). The L1/L2 grant is constituted by, for example, resource assignment information (10 bits), MCS (Modulation and Coding Scheme) (2 bits), transport block size (6 bits), HARQ (Hybrid Automatic Repeat Request) redundancy version (2 bits), demodulation pilot signal strength (2 bits), and mobile station identification information C-RNTI (16 bits).

In the first embodiment of the present invention, the base station apparatus A includes reception quality information-dedicated transmission permission information, which is for permitting the mobile station apparatus B to transmit only the reception quality information using a resource assigned by the L1/L2 grant, in the L1/L2 grant including reception quality information transmission permission information which is for permitting the mobile station apparatus B to transmit the reception quality information, and transmits the L1/L2 grant. Having received the signal, the mobile station apparatus B transmits, to the base station apparatus A, only the reception quality information using the resource assigned by the L1/L2 grant (corresponding to #slot4, #slot7, and #slot12 in FIG. 3).

The operations in the slots will be described with reference to FIG. 3.

In #slot2, the base station apparatus A, which has determined to instruct the mobile station apparatus B to transmit the reception quality information, transmits the L1/L2 grant in which the permission information (hereinafter, referred to as "reception quality information transmission permission information") is set equal to, for example, "1", to the mobile station apparatus B (71). Hereinafter, in the embodiments of the present invention, the reception quality information transmission permission information is represented by, for example, 1 bit information, and the base station apparatus transmits the L1/L2 grant by setting "1" when permitting the transmission of the reception quality information, or by setting "0" to avoid transmitting the reception quality information. In the present embodiment, although such a setting is employed for simplifying the description, it is obvious that other setting methods can be used. Having received the L1/L2 grant in which the reception quality information transmission permission information is set equal to "1", the mobile station apparatus B simultaneously transmits, to the base station apparatus A, the reception quality information and the uplink data using the resource assigned by the L1/L2 grant (72).

In #slot3, the base station apparatus A transmits a normal L1/L2 grant to the mobile station apparatus B (73), and the mobile station apparatus B that has received the signal transmits, to the base station apparatus A, the uplink data using the resource assigned by the L1/L2 grant (74).

Next, an operation of #slot 4 will be described.

In #slot4, the base station apparatus A, having determined to permit the mobile station apparatus B to transmit only the reception quality information, transmits the L1/L2 grant in which the designation information (hereinafter, referred to as "reception quality information-dedicated transmission permission information") is set equal to, for example, "1", to the mobile station apparatus B (75). Hereinafter, in the embodiments of the present invention, the reception quality information-dedicated transmission permission signal is represented by, for example, 1 bit information, and the base station apparatus transmits the L1/L2 grant by setting "1" when permitting the transmission of only the reception quality information, or by setting "0" to avoid transmitting only the reception quality information. In the present embodiment, although such a setting is employed for simplifying the description, it is obvious that other setting methods can be used. Having received the L1/L2 grant in which the reception quality information-dedicated transmission permission information is set equal to "1", the mobile station apparatus B transmits, to the base station apparatus A, only the reception quality information using the assigned resource (76). However, the mobile station apparatus B transmits the reception quality information and ACK/NACK in case that the ACK/NACK of HARQ for the downlink data needs to be transmitted.

The L1/L2 grants transmitted from the base station apparatus A in #slot2, #slot3, and #slot4 in the first embodiment will be further described. In the L1/L2 grants transmitted in #slot2, #slot3, and #slot4, the reception quality information transmission permission information and the reception quality information-dedicated transmission permission information are always included. Thus, the L1/L2 grants always include 2 bit information. In the 2 bit information, the base station apparatus sets the reception quality information transmission permission information equal to "1" and the reception quality information-dedicated transmission permission information equal to "0" in #slot2 and sets the reception quality information transmission permission information equal to "0" and the reception quality information-dedicated transmission permission information equal to "0" in #slot3. The base station apparatus sets the reception quality information transmission permission information equal to "1" and the reception quality information-dedicated transmission permission information equal to "1" in #slot4. In the explanation of slot2, #slot3, and #slot4 described above, although only information set equal to "1" is described for simplifying the explanation, the L1/L2 grants always include 2 bit information of the reception quality information transmission permission information and the reception quality information-dedicated transmission permission information in the first embodiment. Hereinafter, in the explanation of the embodiments of the present invention, only information set equal to "1" will be basically described for simplifying the explanation.

FIG. 3 similarly illustrates that the base station apparatus A transmits the L1/L2 grants in which the reception quality information transmission permission information is set equal to "1" in #slot6, #slot9, and #slot10, and that the mobile station apparatus B that has received the signals simultaneously transmits, to the base station apparatus A, the reception quality information and the uplink data using the assigned resources (78, 82, and 84). FIG. 3 also illustrates that the base station apparatus transmits a normal L1/L2 grant in #slot11, and that the mobile station apparatus B that has received the signal transmits, to the base station apparatus A, the uplink data using the assigned resource (86). FIG. 3 further illustrates that the base station apparatus transmits L1/L2 grants in which the reception quality information-dedicated transmission permission information is set equal to "1" to the mobile station apparatus B in #slot7 and #slot12, and the mobile station apparatus that has received the signals transmits, to the base station apparatus A, only the reception quality information (80 and 88). In #slot7 and #slot12, only the reception quality information is transmitted to the base station apparatus A even if there is uplink data in the information transmitted by the mobile station apparatus B using the uplink.

In FIG. 3, numerals 105 to 140 indicate the existence of data in the slots. The illustration of the L1/L2 grants depicted with horizontal hatches for #slot2, #slot6, #slot9, and #slot10 indicates that the base station apparatus A transmits L1/L2 grants in which the reception quality information transmission permission information is set equal to "1" and the reception quality information-dedicated transmission permission information is set equal to "0". The illustration of the L1/L2 grants depicted in black for #slot4, #slot7, and #slot12 indicates that the base station apparatus A transmits L1/L2 grants in which the reception quality information transmission permission information is set equal to "1" and the reception quality information-dedicated transmission permission information is set equal to "1".

The illustration of the transmission forms depicted with diagonal lines (equivalent to reception quality information) and white frames (equivalent to uplink data) for #slot2, #slot6, #slot9, and #slot10 indicates that the mobile station apparatus B simultaneously transmits, to the base station apparatus A, the reception quality information and the uplink data. The illustration of the transmission forms depicted in lattice pattern for #slot4, #slot7, and #slot12 indicates that the mobile station apparatus B transmits, to the base station apparatus A, only the reception quality information.

The processing flow corresponding to the slots will be described with reference to the diagram on the right side of FIG. 3.

In #slot2, the base station apparatus A transmits an L1/L2 grant in which the reception quality information transmission permission information is set equal to "1" (71). Receiving the signal, the mobile station apparatus B simultaneously transmits the reception quality information and the uplink data using the assigned resource (72). The same processing is executed in #slot6, #slot9, and #slot 10.

In #slot3, the base station apparatus A transmits a normal L1/L2 grant (73). Receiving the signal, the mobile station apparatus B transmits the uplink data using the assigned resource (74). The same processing is executed in #slot11.

In #slot4, the base station apparatus A transmits an L1/L2 grant in which the reception quality information-dedicated transmission permission information is set equal to "1" (75). Receiving the signal, the mobile station apparatus B transmits, to the base station apparatus, only the reception quality information using the assigned resource (76). In #slot7 and #slot12, only the reception quality information is transmitted to the base station apparatus A even if there is uplink data in the information transmitted by the mobile station apparatus B using the uplink.

The reception quality information-dedicated transmission permission information included in the L1/L2 grant can be represented by other information included in the L1/L2 grant without adding a new information bit. For example, all values of HARQ redundancy versions for the uplink data included in the L1/L2 grants can be set equal to 0, all values of MCS for the uplink data can be set equal to 0, or the transport block size for the uplink data can be set equal to 0 to represent the reception quality information-dedicated transmission permission information. The fact that these values are set equal to 0 denotes that the L1/L2 grants from the base station apparatus indicate that there is no need to transmit anything in the uplink data transmitted from the mobile station apparatus. The mobile station apparatus that has received the signal recognizes that the L1/L2 grant from the base station apparatus is not a normal L1/L2 grant and transmits only the reception quality information to the base station apparatus.

Thus, in #slot4, #slot7, and #slot12 of FIG. 3, the L1/L2 grants in which all values of the HARQ redundancy versions for the uplink data are set equal to 0, all values of MCS for the uplink data are set equal to 0, or the transport block size for the uplink data is set equal to 0, is transmitted from the base station apparatus A, and the mobile station apparatus B that has received the signal transmits, to the base station apparatus A, only the reception quality information using the resources assigned by the L1/L2 grants. In that case, the reception quality information transmission permission information is set equal to "1". Which information included in the L1/L2 grants transmitted from the base station apparatus A will be used, and with what way of setting in the information the mobile station apparatus B will transmit only the reception quality information are determined in advance in specifications or the like, and this is known information between the base station apparatus A and the mobile station apparatus B. In this way, there is no need to add a new information bit to the L1/L2 grant as the reception quality information-dedicated transmission permission information as a result of using other information included in the L1/L2 grant to represent the reception quality information-dedicated transmission permission information, and the mobile station apparatus B can transmit only the reception quality information to the base station apparatus A without increasing the amount of information included in the L1/L2 grant.

As described, according to the first embodiment of the present invention, the base station apparatus transmits an L1/L2 grant including reception quality information-dedicated transmission permission information that permits transmission of only the reception quality information, and the mobile station apparatus that has received the signal transmits only the reception quality information to the base station apparatus. As a result, the mobile station apparatus can transmit only the reception quality information.

The mobile station apparatus can transmit reception quality information including a large amount of information because the resource assigned by the L1/L2 grant including the reception quality information-dedicated transmission permission information from the base station apparatus is used to transmit the reception quality information. As a result, for example, the mobile station apparatus can transmit the reception quality information including a large amount of information even in a service in which a great amount of data (UDP packets), such as moving images, is continuously downloaded without uplink data.

Furthermore, since the reception quality information-dedicated transmission permission information, which permits the mobile station apparatus to transmit only the reception quality information, is included in the L1/L2 grant and transmitted to the mobile station apparatus, the base station apparatus can control how often the mobile station apparatus transmits only the reception quality information.

This allows transmission control flexibly responding to the amount of information and the frequency of transmissions of the reception quality information transmitted from the mobile station apparatus, and more efficient communication control (scheduling) between the base station apparatus and the mobile station apparatus can be achieved.

Second Embodiment

Figure 4:
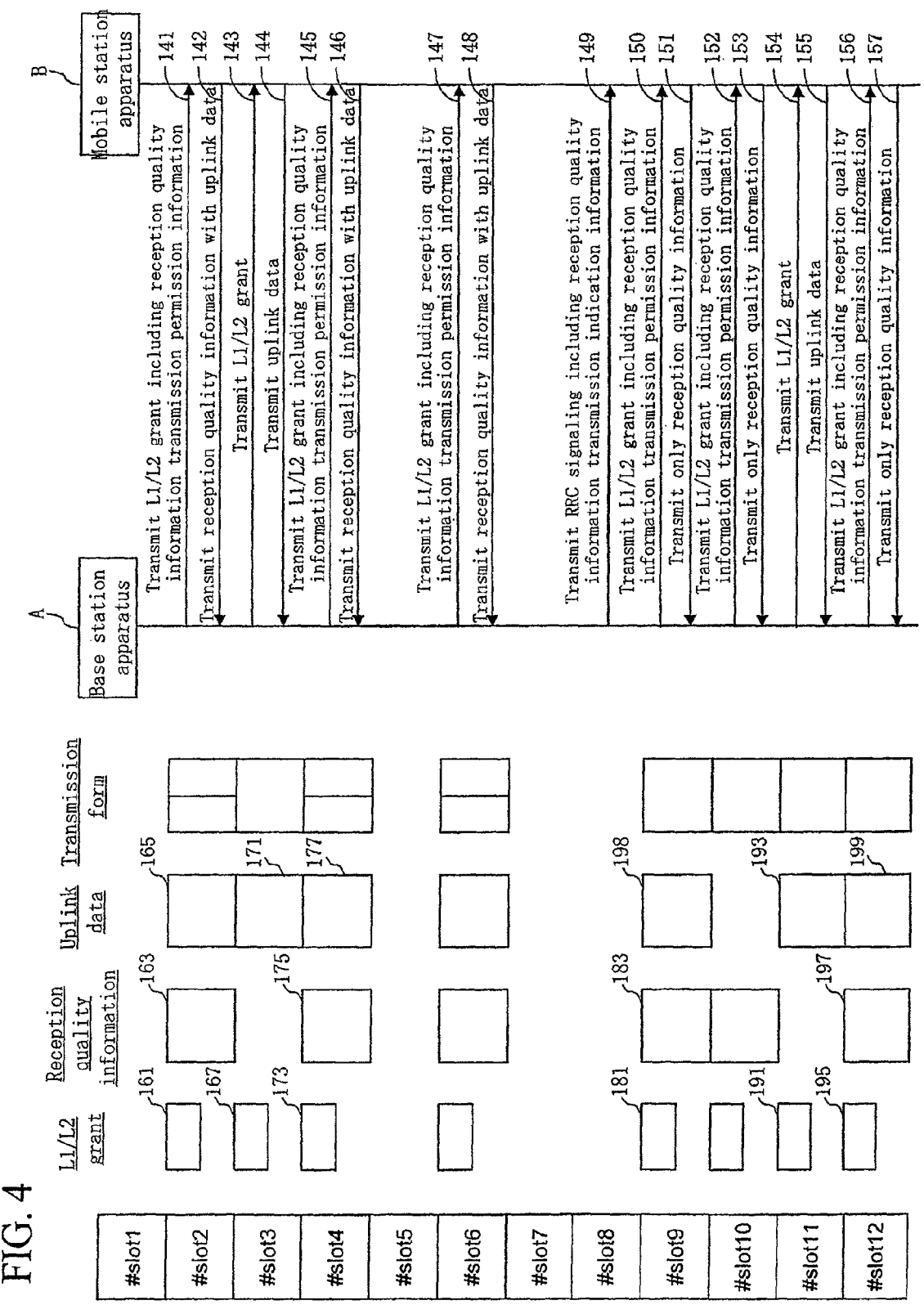
FIG. 4 is a diagram for explaining a second embodiment of the present invention and a processing flow.

FIG. 4 is a diagram for explaining a communication technique according to a second embodiment of the present invention. A diagram on the left side of FIG. 4 illustrates control signals (L1/L2 grants) transmitted from the base station apparatus to the mobile station apparatus, reception quality information, uplink data, and transmission forms of information transmitted in uplink, and a diagram on the right side illustrates a processing flow corresponding to the slots. In FIG. 4, operations from #slot1 to #slot12 are illustrated as an example.

In the second embodiment of the present invention, the base station apparatus transmits RRC signaling including reception quality information transmission instruction information to the mobile station apparatus. The base station apparatus also transmits an L1/L2 grant including reception quality information transmission permission information which permits the mobile station apparatus to transmit, the reception quality information, to the mobile station apparatus. The reception quality information transmission instruction information herein is, as described below, information for designating to use the reception quality information transmission permission information (information for designating to transmit the reception quality information) as the reception quality information-dedicated transmission permission information (information for designating to transmit only the reception quality information). Numerals 161 to 199 have similar meaning as in FIG. 3.

The operations in the slots will be described with reference to FIG. 4.

Prior to #slot1, it is designated in the reception quality information transmission instruction information in the RRC signaling from the base station apparatus A that the mobile station apparatus B should transmit the reception quality information to the base station apparatus whenever an L1/L2 grant in which the reception quality information transmission permission information is set equal to "1" is received.

As described also in the first embodiment, the base station apparatus A, which has determined in #slot2 to instruct the mobile station apparatus B to transmit the reception quality information, transmits an L1/L2 grant in which the reception quality information transmission permission information is set equal to "1", to the mobile station apparatus B (141). Having received the L1/L2 grant including the reception quality information transmission permission information, the mobile station apparatus B simultaneously transmits, to the base station apparatus A, the reception quality information and the uplink data using the resource assigned by the L1/L2 grant (142). In #slot3, the base station apparatus A transmits a normal L1/L2 grant to the mobile station apparatus B (143), and the mobile station apparatus B that has received the signal transmits, to the base station apparatus A, the uplink data using the resource assigned by the L1/L2 grant (144).

FIG. 4 similarly illustrates that the base station apparatus A transmits L1/L2 grants in which the reception quality information transmission permission information is set equal to "1", in #slot4 and #slot6, and the mobile station apparatus B that has received the signal simultaneously transmits, to the base station apparatus, the uplink data and the reception quality information using the assigned resources (146 and 148).

Next, an operation of #slot8 will be described.

In #slot8, the base station apparatus A designates the mobile station apparatus B to use the reception quality information transmission permission information as the reception quality information-dedicated transmission permission information, by the RRC signaling including the reception quality information transmission instruction information (149).

The reception quality information transmission instruction information will be described here. In the present second embodiment, the mobile station apparatus B that has received the RRC signaling including the reception quality information transmission instruction information interprets the reception quality information transmission permission information included in the L1/L2 grant transmitted from the base station apparatus A as the reception quality information-dedicated transmission permission information. For example, if the base station apparatus A represent the reception quality information transmission permission information by an information bit "A", information represented by the same information bit "A" serves as the reception quality information-dedicated transmission permission information after the RRC signaling including the reception quality information transmission instruction information is received.

This point will be described using FIG. 4.

In FIG. 4, it is assumed that the base station apparatus sets the information bit "A", which represents the reception quality information transmission permission information, equal to "1" in #slot2, #slot4, and #slot6 to permit the mobile station apparatus to transmit the reception quality information. Having received the signal, the mobile station apparatus B simultaneously transmits the reception quality information and the uplink data. The base station apparatus A transmits the RRC signaling including the reception quality information transmission instruction information in #slot8 (149). The base station apparatus A can further set the same information bit "A", which represents the reception quality information transmission permission information, equal to "1" in #slot9, #slot10, and #slot12 to permit the mobile station apparatus B to transmit only the reception quality information. Thus, the reception quality information transmission permission information and the reception quality information-dedicated transmission permission information represented as 2 bit information in the first embodiment can be combined into the same one information (information bit "A") by transmitting the RRC signaling. It can also be stated that the reception quality information transmission instruction information included in the RRC signaling from the base station apparatus A is information for switching the interpretation from the reception quality information transmission permission information to the reception quality information-dedicated transmission permission information.

In #slot9 of FIG. 4, the base station apparatus A transmits an L1/L2 grant in which the reception quality information transmission permission information is set equal to "1", and the mobile station apparatus B that has received the signal transmits, to the base station apparatus A, only the reception quality information although there is uplink data in the information transmitted using the uplink (153). Thus, in the slot after the RRC signaling including the reception quality information transmission instruction information is transmitted, the mobile station apparatus B that has received the L1/L2 grant in which the reception quality information transmission permission information is set equal to "1" does not transmit the uplink data to the base station apparatus A even if there is uplink data in the information transmitted using the uplink. In FIG. 4, the mobile station apparatus B that has received the L1/L2 grant in which the reception quality information transmission permission information is set equal to "1", similarly transmits only the reception quality information to the base station apparatus in #slot12 (157).

The #slot10 illustrates that the base station apparatus A transmits the L1/L2 grant in which the reception quality information transmission permission information is set equal to "1", to the mobile station apparatus B (152), and that the mobile station apparatus B that has received the signal transmits, to the base station apparatus A, only the reception quality information using the resource assigned by the L1/L2 grant (153).

In #slot11, the base station apparatus A transmits a normal L1/L2 grant to the mobile station apparatus B (154), and the mobile station apparatus B that has received the signal transmits, to the base station apparatus A, the uplink data using the resource assigned by the L1/L2 grant (155).

Next, a processing flow corresponding to the slots will be described.

In #slot2, the base station apparatus A transmits an L1/L2 grant in which the reception quality information transmission permission information is set equal to "1" (141). Having received the signal, the mobile station apparatus B simultaneously transmits the reception quality information and the uplink data using the assigned resource (142). The same processing is executed in #slot4 and #slot6.

In #slot3, the base station apparatus transmits a normal L1/L2 grant (143). Having received the signal, the mobile station apparatus B transmits the uplink data using the assigned resource (144). The same processing is executed in #slot11.

In #slot8, the base station apparatus A transmits RRC signaling including reception quality information transmission designation information (149) to designate that the reception quality information transmission permission information be used as the reception quality information-dedicated transmission permission information. Having received the signal, the mobile station apparatus B determines the reception quality information transmission permission information as the reception quality information-dedicated transmission permission information in the subsequent slots (switches the interpretation).

In #slot9, the base station apparatus A transmits an L1/L2 grant in which the reception quality information transmission permission information is set equal to "1" (150). Having received the signal, the mobile station apparatus B transmits, to the base station apparatus A, only the reception quality information using the assigned resource although there is uplink data in the information to be transmitted using the uplink (151). The same processing is executed in #slot 12.

In #slot10, the base station apparatus A transmits an L1/L2 grant in which the reception quality information-dedicated transmission permission information is set equal to "1" (152). Having received the signal, the mobile station apparatus B transmits, to the base station apparatus A, only the reception quality information using the assigned resource (153).

As described, according to the second embodiment of the present invention, the base station apparatus transmits the RRC signaling including the reception quality information transmission designation information and designates the mobile station apparatus that has received the signal to use the reception quality information transmission permission information as the reception quality information-dedicated transmission permission information. As a result, the mobile station apparatus B can transmit only the reception quality information to the base station apparatus A without increasing the amount of information included in the L1/L2 grant.

The mobile station apparatus can transmit the reception quality information including a large amount of information since the resource assigned by the L1/L2 grant including the reception quality information transmission permission information from the base station apparatus is used to transmit the reception quality information. As a result, for example, the mobile station apparatus can transmit the reception quality information including a large amount of information even in a service in which a great amount of data (UDP packets), such as moving images, is continuously downloaded without uplink data.

Furthermore, since the reception quality information transmission permission information that permits the mobile station apparatus to transmit the reception quality information is included in the L1/L2 grant and transmitted to the mobile station apparatus, the base station apparatus can control how often the mobile station apparatus transmits the reception quality information.

This allows transmission control flexibly responding to the amount of information and the frequency of transmissions of the reception quality information transmitted from the mobile station apparatus, and more efficient communication control (scheduling) between the base station apparatus and the mobile station apparatus can be achieved.

The RRC signaling including the reception quality information transmission instruction information from the base station apparatus in the second embodiment of the present invention is transmitted when, for example, the service performed between the mobile station apparatus and the base station apparatus switches from a normal service in which uplink data exists, to a service in which a great amount of data (UDP packets), such as moving images, is continuously downloaded without a great volume of uplink data.

All embodiments of the present invention can also be applied to the transmit diversity such as SDM (Space Division Multiplexing) using MIMO communication (Multiple Input Multiple Output), SFBC (Space-Frequency Block Diversity), and CDD (Cyclic Delay Diversity). The reception quality information in the present embodiment includes the number of streams that the mobile station apparatus can receive in the MIMO communication (RANK information) and index information indicating information of preprocessing (Pre-coding) performed in advance to correctly separate a plurality of streams transmitted from the base station apparatus (PMI (Pre-coding Matrix Index) information).

Although the embodiments of the present invention have been described in detail with reference to the drawings, the specific configurations are not limited to the embodiments, and designs and the like that do not depart from the scope of the invention are also included in the claims.

INDUSTRIAL APPLICABILITY

The present invention is applicable to a communication apparatus.

The invention claimed is:

1. A base station apparatus which assigns, to a mobile station apparatus, a physical uplink shared channel by using a physical downlink control channel, the physical uplink shared channel being used for transmitting uplink data, the base station apparatus comprising:
   a transmitter which is configured to transmit on the physical downlink control channel, to the mobile station apparatus, an indication instructing the mobile station apparatus to transmit reception quality information without the uplink data on the physical uplink shared channel assigned by using the physical downlink control channel, wherein
   the indication is specified based on values to which a plurality of fields of information transmitted on the physical downlink control channel are set,
   one of the plurality of fields is a field used for instructing the mobile station apparatus to transmit the reception quality information and another is a field used for indicating a redundancy version, and
   for instructing the mobile station apparatus to transmit the reception quality information without the uplink data on the physical uplink shared channel, the field used for instructing the mobile station apparatus to transmit the reception quality information is set to a first single predetermined value and the field used for indicating the redundancy version is set to a second single predetermined value.

2. A mobile station apparatus which transmits, to a base station apparatus, uplink data on a physical uplink shared channel, the physical uplink shared channel being assigned by using a physical downlink control channel, the mobile station apparatus comprising:
   a receiver which is configured to receive on the physical downlink control channel, from the base station apparatus, an indication instructing the mobile station apparatus to transmit reception quality information without the uplink data on the physical uplink shared channel, and
   a transmitter which is configured to transmit on the physical uplink shared channel, to the base station apparatus, the reception quality information without the uplink data based on the indication which is received on the physical downlink control channel, wherein
   the indication is specified based on values to which a plurality of fields of information transmitted on the physical downlink control channel are set,
   one of the plurality of fields is a field used for instructing the mobile station apparatus to transmit the reception quality information and another is a field used for indicating a redundancy version, and
   for instructing the mobile station apparatus to transmit the reception quality information without the uplink data on the physical uplink shared channel, the field used for instructing the mobile station apparatus to transmit the reception quality information is set to a first single predetermined value and the field used for indicating the redundancy version is set to a second single predetermined value.

3. A communication method of a base station apparatus which assigns, to a mobile station apparatus, a physical uplink shared channel by using a physical downlink control channel, the physical uplink shared channel being used for transmitting uplink data, the communication method comprising:
   transmitting, by the base station apparatus, on the physical downlink control channel, to the mobile station apparatus, an indication instructing the mobile station apparatus to transmit reception quality information without the uplink data on the physical uplink shared channel assigned by using the physical downlink control channel, wherein
   the indication is specified based on values to which a plurality of fields of information transmitted on the physical downlink control channel are set,
   one of the plurality of fields is a field used for instructing the mobile station apparatus to transmit the reception quality information and another is a field used for indicating a redundancy version, and for instructing the mobile station apparatus to transmit the reception quality information without the uplink data on the physical uplink shared channel, the field used for instructing the mobile station apparatus to transmit the reception quality information is set to a first single predetermined value and the field used for indicating the redundancy version is set to a second single predetermined value.

4. A communication method of a mobile station apparatus which transmits, to a base station apparatus, uplink data on a physical uplink shared channel, the physical uplink shared channel being assigned by using a physical downlink control channel, the communication method comprising:

receiving, by the mobile station apparatus, on the physical downlink control channel, from the base station apparatus, an indication instructing the mobile station apparatus to transmit reception quality information without the uplink data on the physical uplink shared channel, and transmitting on the physical uplink shared channel, to the base station apparatus, the reception quality information without the uplink data based on the indication which is received on the physical downlink control channel, wherein the indication is specified based on values to which a plurality of fields of information transmitted on the physical downlink control channel are set, one of the plurality of fields is a field used for instructing the mobile station apparatus to transmit the reception quality information and another is a field used for indicating a redundancy version, and for instructing the mobile station apparatus to transmit the reception quality information without the uplink data on the physical uplink shared channel, the field used for instructing the mobile station apparatus to transmit the reception quality information is set to a first single predetermined value and the field used for indicating the redundancy version is set to a second single predetermined value.

* * * * *